United States Patent [19]

Vesterlund

[11] 4,233,086
[45] Nov. 11, 1980

[54] METHOD FOR PROVIDING A DIFFUSION BARRIER

[75] Inventor: Gunnar Vesterlund, Vasteras, Sweden

[73] Assignee: AB Asea-Atom, Vasteras, Sweden

[21] Appl. No.: 964,192

[22] Filed: Nov. 28, 1978

[51] Int. Cl.² ............................ G21B 3/06; C23F 7/02
[52] U.S. Cl. .................................. 148/6.3; 204/37 R;
  204/52 R; 176/82; 176/71 R
[58] Field of Search ...................... 176/82, 83, 91 R;
  204/37 R, 38 B, 52 R, 52 Y; 148/6.3

[56] References Cited

U.S. PATENT DOCUMENTS

| | | | |
|---|---|---|---|
| 2,899,345 | 8/1959 | Oshry | 148/6.3 |
| 3,556,870 | 1/1971 | Debray et al. | 148/6.3 |
| 4,017,368 | 4/1977 | Wax et al. | 156/656 |
| 4,093,756 | 6/1978 | Donaghy | 427/305 |

OTHER PUBLICATIONS

Roy, Oxidation-Resistant Coatings for Zirconium Alloys, Chem. Abs. vol. 81:28474d 8-74.

*Primary Examiner*—Ralph S. Kendall
*Attorney, Agent, or Firm*—Watson, Cole, Grindle & Watson

[57] ABSTRACT

A method for providing a barrier against copper diffusion into a zirconium alloy tube which is lined with copper for the purpose of increasing the resistance of the tube to stress corrosion induced by fission products when the tube is used to fuel a nuclear reactor. The method involves the deposition of a copper lining on the zirconium alloy tube and the subsequent exposure of the lined tube to a substance such as steam, water, nickel oxide or carbon dioxide or another material which has the ability to oxidize the zirconium without oxidizing the copper. Thus, a zirconium oxide layer is developed between the zirconium alloy tube and the copper lining thereon.

6 Claims, 1 Drawing Figure

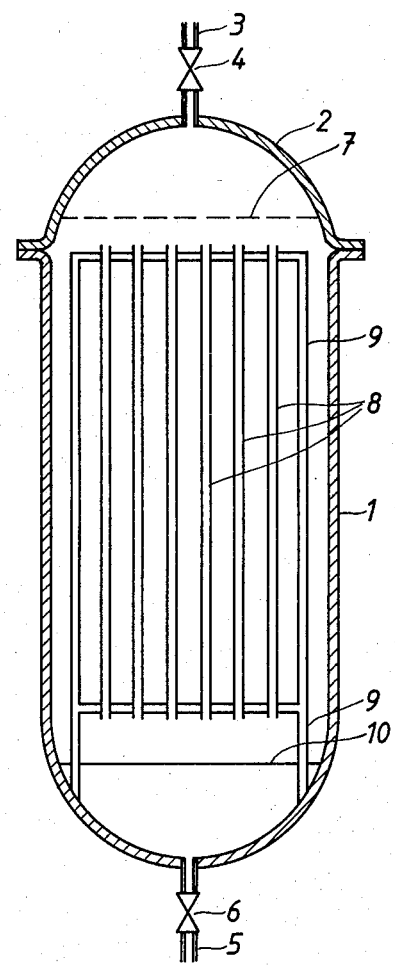

METHOD FOR PROVIDING A DIFFUSION BARRIER

BACKGROUND OF THE INVENTION

1. Field of the Invention

The present invention relates to the field of copper clad, zirconium alloy tubes useful as fuel for nuclear reactors, and in particular to the provision of a barrier between the zirconium alloy and the copper lining to prevent diffusion of copper into the zirconium alloy during the operation of the reactor.

2. Description of the Prior Art

Thin-walled zirconium alloy tubes are often used as cladding tubes for fuel for nuclear reactors. Such tubes may be internally lined or clad with copper to increase the resistance of the tube to stress corrosion induced by fission products. For neutron economy it is desirable for such lining to be relatively thin. One problem often encountered when such copper clad, zirconium alloy tubes are used is that during the operation of the nuclear reactor the copper from the lining may diffuse into the zirconium alloy tube so that after a time the copper lining loses its ability to protect the tube. A previously known method for preventing the diffusion of copper from the lining into the zirconium alloy tube involved the provision of a coating of zirconium dioxide on the zirconium alloy before the copper lining was applied. The principal disadvantage of such method, however, was that electrolytic deposition of the copper layer on the tube was not then possible. Instead it became necessary to deposit the copper on the tube using chemical methods which are considerably more time-consuming and expensive than galvanic methods. Another disadvantage of this known method was that the coating of zirconium dioxide on the zirconium alloy tube increased the difficulty of utilizing chemical methods for application of the copper layer because activating substances were necessary and harmful residues thereof had to be removed.

SUMMARY OF THE INVENTION

According to the concepts and principles of the present invention, a method is provided for manufacturing copper clad, zirconium alloy tubes wherein the diffusion of copper into the zirconium alloy during use of the tube as nuclear reactor fuel may be minimized if not eliminated completely. And this is done in a manner such that the copper cladding may be applied to the tube electrolytically. Moreover, the use of the invention facilitates the use of chemical methodology for cladding of the tube with copper.

In its broadest aspects, the invention provides a method for manufacturing a diffusion resistant, copper clad, zirconium alloy tube. The method comprises first the furnishing of a tube constructed of a zirconium alloy and the depositing of a copper lining on at least the internal surfaces of the tube. The copper lined surfaces of the tube are then contacted with a substance such as stream, water, nickel oxide, carbon monoxide or carbon dioxide, or some other substance which is capable of oxidizing zirconium without oxidizing copper. The contacting operation is conducted under conditions suitable for causing the oxidation of the zirconium to occur and is continued until a barrier of zirconium oxide is formed between the copper lining and the zirconium based alloy. Preferably the copper layer is applied electrolytically and the contacting is conducted at a temperature in the range of from 200 to 550° C.

BRIEF DESCRIPTION OF THE DRAWING

The single FIGURE illustrates an autoclave apparatus useful for conducting the contacting step of the present invention.

DETAILED DESCRIPTION OF THE INVENTION

In accordance with the present invention, a tube constructed of a zirconium alloy to be used for cladding of fuel in a light-water reactor may be activated using an aqueous solution containing 0.2 moles per liter of ammonium fluoride and 0.13 moles per liter of hydrofluoric acid. The activated tube is then provided with an internal copper lining. Preferably the copper lining is deposited electrolytically. This may be accomplished by connecting the tube to the negative pole of a DC source and connecting a copper anode arranged centrally in the tube to the positive pole of the DC source. An electrolyte, which preferably may consist of a sulphuric acid-copper sulfate solution having a pH of 0.5, may be supplied to the space between the tube and the anode. The tube and the anode may be moved relative to each other during the operation and the electrolysis may be performed using a current density of approximately 0.3 amps per square centimeter. Manifestly, the copper lining may also be deposited chemically. And in either event in accordance with the invention the copper lining should have a thickness in the range of from about 1 to 25 microns to provide appropriate ductility to withstand mechanical stresses.

The zirconium alloy for the tubes preferably consists of a zirconium-tin alloy such as, for example, the zirconium alloys known under the trade names Zircaloy 2 and Zircaloy 4. These alloys contain 1.2 to 1.7 weight percent tin, 0.07 to 0.24 weight percent iron, 0.05 to 0.15 weight percent chromium, 0 to 0.08 weight percent nickel, and 0.09 to 0.16 weight percent oxygen, the remainder being zirconium and possibly minor amounts of impurities of the ordinary kind.

With reference to the drawing, a plurality of copper clad, zirconium alloy tubes 8 prepared by electrolytic deposition as described above and having a copper layer having a thickness of about 5 microns, are treated, in accordance with the invention, in autoclave 1. Autoclave 1 is provided with a cover 2 and may be provided with heating means such as heating coils arranged in the sheath. Or autoclave 1 may be heated, for example, by circulating hot air on the outside thereof. Autoclave 1 is equipped with an upper outlet tube 3 provided with a valve 4 and a lower outlet tube 5 provided with a valve 6.

Before tubes 8 are placed in autoclave 1, the latter is filled with water to the level 7 illustrated by the broken line, and then the water is boiled at atmospheric pressure for about one-half hour with valve 4 open. By this treatment the water is degassed and the expelled gases, including oxygen, leave autoclave 1 through tube 3.

After the water has been degassed, cover 2 is removed and tubes 8 are positioned in a rack 9 in autoclave 1 and cover 2 is reinstalled. Rack 9 is of such a nature that the interiors of tubes 8 are in an open communication with the environment surrounding the tubes in autoclave 1. After additional boiling, so that any air which may have accompanied the tubes into the autoclave may be removed, valve 4 is closed, valve 6 is opened and the bulk of the water is drained out through conduit 5 until the water level in autoclave 1 approximately coincides with the level of unbroken line 10. Valve 6 is then closed.

Hydrogen gas may be introduced into autoclave 1 by way of tube 3 and valve 4 until the content of hydrogen gas in the steam phase in autoclave 1 is approximately 25 ppm. The autoclave is then heated in a manner such that tubes 8 are surrounded by superheated steam at a temperature of about 425° C. and a pressure in the range of from about 1 to 5 bar. After approximately 5 hours under such conditions a barrier layer between the copper layer and the zirconium alloy tube and having a thickness of about 0.5 microns is obtained. After 24 hours the thickness of the barrier layer is about 1 micron. After the barrier layer has been produced, tubes 8 may be treated in a separate furnace at a temperature of about 550° C. for 3 hours or so in an argon atmosphere.

When tubes manufactured in the foregoing manner are subjected to a vacuum treatment at a temperature of 650° C., the copper layer remains intact even after 5 hours. On the other hand the copper layer of a copper clad tube which has not been provided with a barrier layer in accordance with the present invention will be completely diffused into the tube after such vacuum treatment.

According to another embodiment of the invention, the internally copper clad, zirconium alloy tubes 8 are treated with nickel oxide for the purpose of developing an appropriate barrier layer. In this embodiment, each tube 8 is filled with nickel oxide powder and with argon gas and thereafter each tube 8 is sealed at each of its ends. The sealed tubes are then placed in a furnace and maintained at a temperature of about 400° C. for about 48 hours. As a result of such treatment, a barrier layer having a thickness of about 1 micron is developed between the copper layer and the zirconium alloy tube. After the furnace treatment has been completed, the nickel oxide powder is removed from the tubes. The copper layer in these tubes remains intact even after a 5 hour vacuum treatment at a temperature of about 650° C.

In yet another embodiment of the present invention, the tubes 8 with internal copper linings may be treated with water for the purpose of developing the barrier layer. The treatment may take place in autoclave 1 with water which has been degassed by boiling. When the tubes are treated with water at a temperature of about 350+ C. and a pressure of approximately 17.8 MPa for 360 hours or so, a barrier layer with a thickness of about 1 micron is formed. In these tubes the copper layer remains intact even after a 5 hour vacuum treatment at a temperature of about 650° C.

When water is used as the substance for oxidizing zirconium without oxidizing copper in accordance with the invention, the same should be substantially free from oxygen to substantially eliminate copper oxidation. Oxygen free water may be achieved simply by boiling the water to drive off dissolved oxygen. Suitable oxygen free water may also be produced by bubbling a preferably inert gas through the water until substantially all of the dissolved oxygen has been removed. Steam which is correspondingly free from oxygen and which is suitable for use in accordance with the invention may be obtained by evaporating oxygen free water that has been provided in the manner set forth above.

Substances other than water, steam and nickel oxide are capable of oxidizing zirconium without oxidizing copper and accordingly may be used for the purpose of producing the diffusion barrier in accordance with the present invention. For example, other gaseous and liquid substances containing oxygen such as carbon dioxide, carbon monoxide, sulphur dioxide and other sulphur oxides may be used. Also useful for the purposes of the invention are many oxygen containing solids, particularly those metal oxides which are not harmful in the finished product from a nuclear point of view, such as, for example, NiO, FeO and other oxides of nickel and iron as well as oxides of molybdenum and copper. When using such solid substances for purposes of the present invention, they suitably may be packed into the tube in powdered state.

It has proved to be advantageous, in accordance with the present invention, to have from 0 to 50 ppm hydrogen present in the substance that is used to produce the barrier during such production. When steam or water are used, a hydrogen content of from about 0.01 ppm to 50 ppm is preferred. In this regard it has been found that the presence of hydrogen provides improved adhesion between the copper layer and the underlaying zirconium alloy material. Improved adhesion may also be accomplished by subjecting the tube, after the barrier has been formed, to heat treatment at a temperature in the range of from about 300° C. to 800° C. in a vacuum or in an atmosphere, such as argon or helium, which is inert with respect to zirconium and copper. It is, of course, possible to utilize both the hydrogen treatment and the heat treatment to improve adhesion. On the other hand, neither the provision of hydrogen nor the heat treatment are necessary to achieve a diffusion resistant copper clad, zirconium alloy tube.

The contacting of the copper clad tube with the substance that is capable of causing the development of the barrier is continued, preferably at a temperature in the range of from about 200° C. to 550° C., until a barrier which is effective to resist diffusion of copper into the zirconium alloy of the tube is obtained. The barrier is believed to be in the form of a layer located between the copper lining and the zirconium alloy and is believed to consist of an oxide layer, at least the bulk of which is zirconium dioxide. Preferably it is believed that that barrier layer should have a thickness in the range of 0.01 to 10 microns and even more preferably the barrier should be at least 0.1 microns in thickness.

I claim:
1. A method for manufacturing a diffusion resistant, copper clad, zirconium alloy tube comprising:
furnishing a tube constructed of a zirconium alloy material;
depositing a copper lining on at least the internal surfaces of said tube; and
contacting at least the internal copper-lined surfaces of the tube with steam at a temperature in the range of 200 to 550° C. until a barrier of zirconium oxide is formed between the copper lining and the zirconium-based alloy.
2. A method as set forth in claim 1 wherein said depositing step is accomplished electrolytically.
3. A method as set forth in claim 1 wherein said depositing step is continued until said copper layer has a thickness of from 1 to 25 microns.
4. A method as set forth in claim 1 wherein said contacting step is continued until said barrier has a thickness of from 0.1 to 10 microns.
5. A method as set forth in claim 1 wherein said substance contains from 0 to 50 ppm hydrogen.
6. A method as set forth in claim 1 wherein after said contacting step said tube is subjected to heat treatment at a temperature in the range of from 300 to 800° C. in a vacuum or in an atmosphere which is inert with respect to zirconium and copper.

* * * * *

UNITED STATES PATENT OFFICE
CERTIFICATE OF CORRECTION

PATENT NO. : 4,233,086
DATED : November 11, 1980
INVENTOR(S) : Gunnar Vesterlund It is certified that error appears in the above-identified patent and that said Letters Patent are hereby corrected as shown below:

[30] FOREIGN APPLICATION PRIORITY DATA

March 15, 1978    Sweden............7802976

*Signed and Sealed this*

*Fourteenth* Day of *April 1981*

[SEAL]

*Attest:*

RENE D. TEGTMEYER

*Attesting Officer*    *Acting Commissioner of Patents and Trademarks*